United States Patent
Hayashi

(10) Patent No.: US 8,371,413 B2
(45) Date of Patent: Feb. 12, 2013

(54) CONTROL DEVICE FOR POWER TRANSMITTING DEVICE FOR FOUR-WHEEL DRIVE HYBRID-VEHICLE

(75) Inventor: Kenichiro Hayashi, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 546 days.

(21) Appl. No.: 12/640,649

(22) Filed: Dec. 17, 2009

(65) Prior Publication Data
US 2010/0175944 A1 Jul. 15, 2010

(30) Foreign Application Priority Data
Jan. 14, 2009 (JP) .................................. 2009-005335

(51) Int. Cl.
*B60K 17/34* (2006.01)
*B60K 6/20* (2007.10)

(52) U.S. Cl. ..................... 180/233; 180/65.21; 180/242; 180/243; 701/69

(58) Field of Classification Search .................. 180/65.1, 180/65.21, 233, 242, 243; 701/69
See application file for complete search history.

(56) References Cited

U.S. PATENT DOCUMENTS
7,350,603 B2 * 4/2008 Takami et al. ............. 180/65.25

FOREIGN PATENT DOCUMENTS
JP 2004-114944 4/2004

* cited by examiner

*Primary Examiner* — Ruth Ilan
*Assistant Examiner* — Marc A Scharich
(74) *Attorney, Agent, or Firm* — Oblon, Spivak, McClelland, Maier & Neustadt, L.L.P.

(57) ABSTRACT

A control device for a power transmitting device for four-wheel drive hybrid-vehicle is provided capable of preventing the occurrence of negative torque resulting from power generation control of a second electric motor MG2. Drive-force control executes a control such that rear-wheel output torque Tpr of rear wheels falls in a positive torque when first and second electric motors MG1 and MG2execute power generation controls, thereby preventing torques of front and rear wheels from orienting in different directions. Accordingly, the front and rear wheels have torques oriented in the same direction, thereby favorably preventing discomfort feeling during a vehicle running.

6 Claims, 8 Drawing Sheets

CONTROL DEVICE FOR POWER TRANSMITTING DEVICE FOR FOUR-WHEEL DRIVE HYBRID-VEHICLE

TECHNICAL FIELD

The present invention relates to a power transmitting device for hybrid-vehicle including power distributing mechanism in each of which a drive force is distributed from a drive source to a first electric motor and a transmitting shaft and, more particularly, to a control device for a power transmitting device for four-wheel drive hybrid-vehicle having a central differential device in which a drive force is distributed from a transmitting shaft to a first drive-wheel-side output shaft and second drive-wheel-side output shaft.

BACKGROUND ART

A power transmitting device for four-wheel drive hybrid-vehicle has been known, which includes a drive source, a power distributing mechanism through which a drive power is distributed from the drive source to a first electric motor and a transmitting shaft, a central differential device connected to the transmitting shaft for distributing the drive power from the transmitting shaft to the first drive-wheel-side output shaft and the second drive-wheel-side output shaft, and a second electric motor connected to second drive wheels to transmit power thereto.

FIG. 11 is a skeleton view illustrating a structure of a conventional power transmitting device 200 for four-wheel drive hybrid-vehicle (hereinafter referred to as a "power transmitting device 200"). The power transmitting device 200 includes an engine 202 functioning as a main drive source, a power distributing mechanism 206 for distributing a drive power from the engine 202 to a first electric motor MG1 and a transmitting shaft 204, a central differential device 212 connected to the transmitting shaft 204 for mechanically distributing the drive power from the transmitting shaft 204 to a first drive-wheel-side output shaft 208 for delivery to front wheels 207 and a second drive-wheel-side output shaft 210 for delivery to rear wheels 209, and a second electric motor MG2 connected to the transmitting shaft 204 via a subsidiary transmission 214 to transmit power thereto.

A drive force of the first drive-wheel-side output shaft 208 is transmitted through a gear pair 216, a front propeller shaft 218, a front differential 220 and a pair of left and right front drive shafts 222 to a pair of left and right front wheels 207. Further, a drive force of the second drive-wheel-side output shaft 210 is transmitted through a rear propeller shaft 224, a rear differential 226 and a pair of left and right rear drive shafts 228 to a pair of left and right rear wheels 209. With the power transmitting device 200, the second electric motor MG2 is interposed between the power distributing mechanism 206 and the central differential device 212 to transmit a drive force from the second electric motor MG2 to the subsidiary transmission 214 through the transmitting shaft 204. Thus, no torque distribution ratio between the front and rear wheels is dependent on the output of the second electric motor MG2. That is, a drive force distribution between the front and rear wheels is mechanically determined in terms of a distribution ratio of the central differential device 212. Accordingly, the drive force distribution between the front and rear wheels has a low degree of freedom, which results in difficulty in obtaining an appropriate drive force distribution depending on a running state of a vehicle.

On the contrary, a hybrid-vehicle drive apparatus, disclosed in Patent Publication 1 (Japanese Patent Publication No. 2004-114944), has substantially the same structure as that of a power transmitting device 300 shown in FIG. 12, to be described in more detail. The power transmitting device 200 has the second electric motor MG2 connected through the subsidiary transmission 214 to the transmitting shaft 204 to transmit power thereto. In contrast, in the power transmitting device 300, the second electric motor MG2 is connected through the subsidiary transmission 214 to the second drive-wheel-side output shaft 210 to transmit power thereto. Thus, the output power of the second electric motor MG2 is transmitted only to the second drive-wheel-side output shaft 210, and therefore, controlling the second electric motor MG2 renders a greater degree of freedom of the drive force distribution than that of the power transmitting device 200.

Further, although not disclosed in Patent Publication 1, as shown in the power transmitting device 300, there has been devised a power transmitting device of the type having a clutch C1 disposed between the first drive-wheel-side output shaft 208 and the second drive-wheel-side output shaft 210. With such a structure, for instance, if the clutch C1 is caused to completely engage, then, the first drive-wheel-side output shaft 208 and the second drive-wheel-side output shaft 210 are caused to unitarily rotate such that the drive force is equally distributed to the front wheels 207 and the rear wheels 209. In addition, if such an engaging device C1 is brought into half-engaged state, the drive force is appropriately distributed depending on engagement torque of the clutch C1. Consequently, a drive force distribution is further increased in degree of freedom.

Here, if a drop occurs in a storage capacity of for instance an electric storage device (battery) from which electric power is supplied to the first and second electric motors MG1 and MG2, for increasing charge capacity of the battery, the first and second electric motors MG1 and MG2 execute power generation controls. First, the power transmitting device 200 in FIG. 11 will be described below with reference to the power generation controls of the first and second electric motors MG1 and MG2. Suppose that a drive force (torque) of the engine 202 is 100, and a drive force distribution ratio between the first electric motor MG1 and the transmitting shaft 204 of the power distributing mechanism 206 is 3:7. Then, torque (Tg) of 30 is transmitted to the first electric motor MG1 and torque (Tr) of 70 is transmitted to the transmitting shaft 204.

Here, suppose that power generation torque (Tm), transmitted via the subsidiary transmission 214 to the second electric motor MG2 is 50, and then torque (Tp=Tr−Tm) of 20 is transmitted to the central differential device 212. Moreover, suppose that a drive force distribution ratio between the first drive-wheel-side output shaft 208 and the second drive-wheel-side output shaft 210 of the central differential device 212 is 4:6. Torque (Tpf) of 8 is transmitted to the first drive-wheel-side output shaft 208, and torque (Tpr) of 12 is transmitted to the second drive-wheel-side output shaft 210. Thus, for the drive force (Te=100) of the engine 202, if torque (Tg) of 30 is transmitted to the first electric motor MG1 and torque (Tm) of 50 is transmitted to the second electric motor MG2, then, a total drive force (Tall) transmitted to the front wheels 207 and the rear wheels 209 becomes 20 (=Tpf+Tpr).

Meanwhile, the power transmitting device 300 shown in FIG. 12 will be described below in a case in which the power generation controls are executed under the same condition as that described above. Suppose that a drive power (torque) of the engine 202 is 100, and a drive force distribution ratio between the first electric motor MG1 and the transmitting shaft 204 by the power distributing mechanism 206 is 3:7. Like the above power transmitting device 200, torque (Tg) of 30 is transmitted to the first electric motor MG1 and torque (Tr) of 70 is transmitted to the transmitting shaft 204. Further, suppose that a front-to-rear-wheel drive force distribution ratio between the first and second drive-wheel-side output shafts 208 and 210 by the central differential device 212 is 7:3. Torque (Tdf) of 49 is transmitted to the first drive-wheel-side output shaft 208, and torque (Tcr) of 21 is transmitted to the second drive-wheel-side output shaft 210. Thus, torque (Tpf) of 49 is transmitted to the front wheels 207.

Meanwhile, if torque (Tm) of 50 is transmitted to the second electric motor MG2 like the power transmitting device 200, then torque (Tpr=Tcr−Tm) of −29 is transmitted to the rear wheels. That is, a total drive force (Tall=Tpf+Tpr) of the front and rear wheels 207 and 209 becomes 20 like that attained with the power transmitting device 200. However, if torque (Tm) transmitted to the second electric motor MG2 exceeds torque (Tcr) of the second drive-wheel-side output shaft 210, negative torque occurs on the rear wheels 209. Thus, the drive force distribution between the front and rear wheels is irregularly achieved, giving discomfort to a driver during for instance a turning running or the like.

The present invention has been completed with the above view in mind, and has an object to provide a control device for power transmitting device for a four-wheel drive hybrid-vehicle having a drive source, a power distributing mechanism for distributing a drive force from the drive source to a first electric motor and a transmitting shaft, a central differential device connected to the transmitting shaft to distribute the drive force from the transmitting shaft to first and second drive-wheel-side output shafts, and a second electric motor connected to the second drive-wheel-side output shaft to transmit power thereto. The control device can prevent the occurrence of negative torque caused by power generation control of the second electric motor.

SUMMARY OF THE INVENTION

For achieving the above object, a first aspect of the present invention provides a control device for a power transmitting device for four-wheel drive hybrid-vehicle having a drive source, a power distributing mechanism for distributing a drive force of the drive source to a first electric motor and a transmitting shaft, a central differential device connected to the transmitting shaft to distribute the drive force from the transmitting shaft to a first drive-wheel-side output shaft and a second drive-wheel-side output shaft, and a second electric motor connected to the second drive-wheel-side output shaft to transmit a power thereto. The control device comprises a drive force control portion that executes a control such that under a circumstance where the first and second electric motors execute electric-power generation controls, an output torque of second drive wheels falls in positive torque.

A second aspect of the present invention is featured by, in the first aspect, that the drive force control portion limits a power generation amount of the second electric motor.

A third aspect of the present invention is featured by, in the second aspect, that the drive force control portion limits the drive force of the drive source and a power generation amount of the first electric motor so as to suppress a fluctuation in a total drive force of the vehicle.

A fourth aspect of the present invention is featured by, in the first aspect, that the control device further comprises an engaging device disposed between the first drive-wheel-side output shaft and the second drive-wheel-side output shaft, and the drive force control portion allows the engaging device to be engaged or half-engaged.

A fifth aspect of the present invention is featured by, in the fourth aspect, that the drive force control portion inhibits an engaging control of the engaging device depending on both a steering angle and a vehicle speed in a turning running.

A sixth aspect of the present invention is featured by, in the fifth aspect, that the drive force control portion limits a power generation amount by the second electric motor under a circumstance where the engaging control for the engaging device is inhibited.

According to the control device for the power transmitting device for four-wheel drive hybrid-vehicle of the first aspect, the drive force control portion executes the control such that under the circumstance where the first and second electric motors execute electric-power generation controls, the output torque of second drive wheels falls in positive torque. This prevents torque of the first drive wheels and torque of the second drive wheels from orienting in different directions. Accordingly, torques of the front and rear wheels are oriented in the same direction, thereby favorably preventing the occurrence of discomfort feeling during a vehicle running.

According to the control device for the power transmitting device for four-wheel drive hybrid-vehicle of the second aspect, the drive force control portion limits the power generation amount of the second electric motor. This can appropriately prevents the second drive wheels from falling in the negative torque.

According to the control device for the power transmitting device for four-wheel drive hybrid-vehicle of the third aspect, the drive force control portion limits the drive force of the drive source and the power generation amount of the first electric motor so as to suppress the fluctuation in the total drive force of the vehicle. This can suppresses the occurrence of discomfort feeling caused by a drive force fluctuation during the vehicle running.

According to the control device for the power transmitting device for four-wheel drive hybrid-vehicle of the fourth aspect, the power transmitting device further comprises the engaging device disposed between the first drive-wheel-side output shaft and the second drive-wheel-side output shaft, and the drive force control portion allows the engaging device to be engaged or half-engaged. Therefore, the drive force distribution between the first drive-wheel-side output shaft and the second drive-wheel-side output shaft can be appropriately altered. Consequently, this can increase torque distribution to the second drive-wheel-side output shaft such that the increased torque transmitted to the second drive-wheel-side output shaft can avoid the second drive wheels from falling in the negative torque.

According to the control device for the power transmitting device for four-wheel drive hybrid-vehicle of the fifth aspect, the drive force control portion inhibits the engaging control of the engaging device depending on both the steering angle and the vehicle speed in the turning running. This can suitably prevents a tight-corner braking phenomenon from occurring during for instance a turning running.

According to the control device for the power transmitting device for the four-wheel drive hybrid-vehicle of the sixth aspect, the drive force control portion limits the power generation amount by the second electric motor under the circumstance where the engaging control for the engaging device is inhibited. This can avoid the occurrence of the tight-corner braking phenomenon, and appropriately prevents the second drive wheels from falling in the negative torque.

DETAILED DESCRIPTION OF THE PREFERRED EMBODIMENTS

Figure 1:
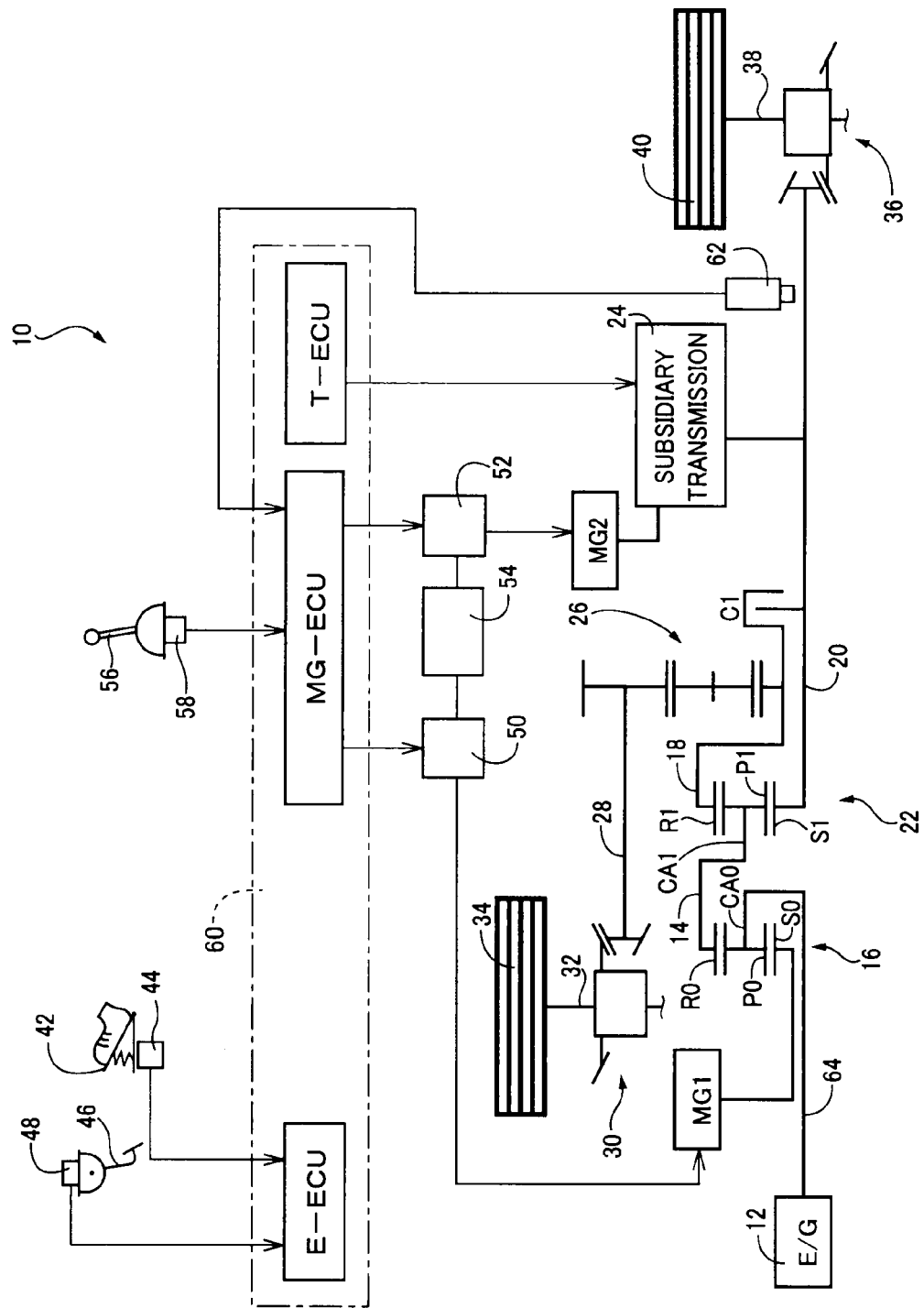
FIG. 1 is a skeleton view illustrating a structure of a power transmitting device for four-wheel drive hybrid-vehicle to which the present invention is applied.

Preferably, here, the power distributing mechanism is structured of a single pinion type planetary gear set having a carrier connected to the drive source, a sun gear connected to the first electric motor, and a ring gear connected to the transmitting shaft. With such a structure, the drive force can be suitably distributed from the drive source to the first electric motor and the transmitting shaft.

Now, a preferred embodiment of the present invention will be described below in detail with reference to the accompanying drawings. Further, various embodiments described below are shown in the drawings in suitably simplified or modified forms, and various component parts are not necessarily and accurately drawn in dimensional ratios and shapes.

[Embodiment 1]

FIG. 1 is a skeleton view illustrating a structure of a power transmitting device 10 for four-wheel drive hybrid-vehicle (hereinafter referred to as a "power transmitting device 10") to which the present invention is applied. The power transmitting device 10 includes a power distributing mechanism 16 through which a drive force (torque) is distributed from an engine 12 (corresponding to a drive source of the present invention) to a first electric motor MG1 and a transmitting shaft 14; a central differential device 22 through which the drive force (torque) is transmitted from the transmitting shaft 14 to a front-wheel output shaft 18 (corresponding to a first drive-wheel-side output shaft) and a rear-wheel output shaft 20 (corresponding to a second drive-wheel-side output shaft); and a second electric motor MG2 operatively connected to the rear-wheel output shaft 20 via a subsidiary transmission 24 operable to perform a shifting in for instance two gear positions. The power transmitting device 10 is of the type preferably applied to a four-wheel drive vehicle, in which the drive force (torque) is distributed from the transmitting shaft 14 to the front-wheel output shaft 18 and the rear-wheel output shaft 20 via the central differential device 22 and a drive force of the second electric motor MG2, is output to the rear-wheel output shaft 20 via the subsidiary transmission 24.

Further, the drive force is transmitted from the front-wheel output shaft 18 to a pair of left and right front wheels 34 (corresponding to first drive wheels of the present invention) via a gear pair 26, a front-wheel propeller shaft 28, a front-wheel differential gear unit 30 and a pair of left and right front-wheel drive shafts 32. In addition, the drive force is transmitted from the rear-wheel output shaft 20 to a pair of left and right rear wheels 40 (corresponding to second drive wheels of the present invention) via a rear-wheel differential gear unit 36 and a pair of left and right rear-wheel drive shafts 38. Moreover, the power transmitting device 10 has a symmetrical structure with respect to its centerline, and hence, a half of the same is omitted herein from FIG. 1.

The power transmitting device 10 is arranged to increase or decrease torque transmitted from the second electric motor MG2 to the rear-wheel output shaft 20, depending on a speed ratio or shifting ratio γs (a rotation speed of the second electric motor MG2/a rotation speed of the rear-wheel output shaft 20) set at the subsidiary transmission 24. The speed ratio γs of the subsidiary transmission 24 is set to a plurality of gear positions of "1" or more. During a power running mode in which the second electric motor MG2 outputs output torque $T_{MG2}$, the subsidiary transmission 24 can transmit the multiplied torque $T_{MG2}$ to the rear-wheel output shaft 20. Thus, the second electric motor MG2 can be formed in a further reduced capacity or a miniaturized structure. With such a structure, when for instance a vehicle speed increases followed by an increase in rotation speed of the rear-wheel output shaft 20, the speed ratio γs of the subsidiary transmission 24 is lowered to reduce rotation speed of the second electric motor MG2 such that the second electric motor MG2 is maintained with favorable operating efficiency. In addition, when the rotation speed of the rear-wheel output shaft 20 decreases, the subsidiary transmission 24 provides a suitably increased speed ratio γs.

The engine 12, corresponding to the drive source of the present invention, forms a main drive source of the power transmitting device 10, and includes a known internal combustion engine such as for instance a gasoline engine or a diesel engine, etc., in which given fuel is combusted for outputting a drive power. Further, the power transmitting device 10 includes an electronic control device 60, mainly composed of a microcomputer, which includes an engine-control electronic control device (E-ECU) to electrically control operating states such as a throttle opening or an intake air quantity, a fuel supply rate and an ignition timing, etc. In addition, the engine-control electronic control device (E-ECU) is supplied with various detection signals from an accelerator-opening sensor 44 for detecting a displacement value of an accelerator pedal 42 and a brake sensor 48 for detecting a brake pedal 46 being operated, etc.

The first and second electric motors MG1 and MG2 are for instance synchronous motors respectively, each of which has at least one of a function to serve as an electric motor (motor) for generating drive torque and another function to serve as an electric power generator (generator), and preferably are motor/generators respectively, each of which is caused to selectively function as the electric motor or the electric power generator. The first and second electric motors MG1 and MG2 are connected via inverters 50 and 52 to an electric storage device 54 such as a battery and a capacitor or the like. A motor/generator-control electronic control device (MG-ECU), incorporated in the electronic control device 60, controls the inverters 50 and 52 such that output torques or regenerative torques (electricity generation torques) of the first and second electric motors MG1 and MG2 are adjusted or determined, respectively. In addition, the motor/generator-control electronic control device (MG-ECU) is supplied with detection signals from an operating position sensor 58 for detecting a displacement position of a shift lever 56, and an output rotation speed sensor 62 for detecting a rotation speed, corresponding to a vehicle speed, of the rear-wheel output shaft 20, etc.

The power distributing mechanism 16 includes a single pinion type planetary gear set composed of three rotary elements including a sun gear S0, a ring gear R0 placed in a concentric relation to the sun gear S0, and a carrier CA0 supporting pinion gears P0 held in meshing engagement with the sun gear S0 and the ring gear R0 such that the pinion gears P0 rotate about their axes and about the axis of the sun gear S0, which performs a known differential action. The planetary gear set is mounted in concentric relation to the engine 12. With the power distributing mechanism 16, further, an input shaft 64 corresponding to a crankshaft of the engine 12 is connected to the carrier CA0 of the power distributing mechanism 16. In contrast, the sun gear S0 is connected to the first electric motor MG1 and the ring gear R0 is connected to the transmitting shaft 14. With the power distributing mechanism 16, the carrier CA0 functions as an input element; the sun gear S0 functions as a reactive element; and the ring gear R0 functions as an output element.

Figure 2:
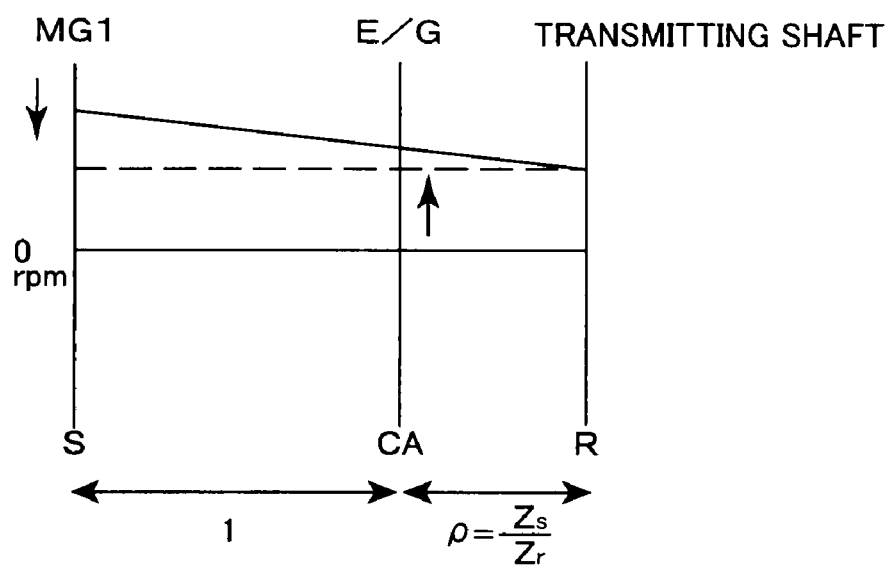
FIG. 2 is a collinear chart showing relative relationships among rotation speeds of various rotary elements in a power distributing mechanism.

The relative relations among rotation speeds of various rotary elements forming the power distributing mechanism 16 are indicated on a collinear chart shown in FIG. 2. In such a collinear chart, longitudinal axes S, CA and R represent axes indicating the rotation speeds of the sun gear S0, the carrier CA0 and the ring gear R0, respectively. The longitudinal axes S, CA and R are spaced from each other by an interval determined such that when an interval between the longitudinal axes S and CA is "1", an interval between the longitudinal axes CA and R corresponds to a gear ratio p (the number of gear teeth Zs of sun gear S0/the number of gear teeth Zr of ring gear R0).

In such a power distributing mechanism 16, if the reactive torque of the first electric motor MG1 is input to the sun gear S0 against output torque (engine torque) $T_E$ of the engine 12 applied to the carrier CA0, direct transmitting torque of the engine 12 appears on the ring gear R0 acting as an output element. Thus, the first electric motor MG1 is caused to function as the electric power generator. That is, in the power distributing mechanism 16, an electrically controlled continuously variable transmission is structured in the form of an electrically controlled shifting mechanism, and includes the first electric motor MG1 connected to the engine 12 to transmit power thereto, which acts as a differential-action electric motor. With such a structure, controlling an operating state of the first electric motor MG1 allows a differential state of the electrically controlled continuously variable transmission to be controlled. As a consequence, the drive power is transmitted from the engine 12 to the transmitting shaft 14 via the power distributing mechanism 16 in the form of such a continuously variable transmission.

When the ring gear R0 has a fixed rotation speed (transmitting-shaft rotation speed) $N_{RO}$, with the power distributing mechanism 16 placed in a controlled differential state, causing the rotation speed of the first electric motor MG1 varies, the rotation speed $N_E$ of the engine 12 continuously (in a non-stepwise fashion). A broken line in FIG. 2 indicates a status in which when the rotation speed of the first electric motor MG1 is reduced from a value indicated by a solid line, the rotation speed $N_E$ of the engine 12 (engine rotation speed) decreases. Further, with the power distributing mechanism 16 rendered operative as the continuously variable transmission, controlling the first electric motor MG1 executes a control such that an operating point (a drive point: determined in terms of for instance the engine rotation speed $N_E$ and engine torque $T_E$) of the engine 12 is set to a value providing for instance optimum fuel consumption.

The subsidiary transmission 24 is structured of an automatic transmission that can perform a shifting in two gear positions including for instance a high-speed gear position "2nd" and a low-speed gear position "1st". Such a shifting can be executed by controlling an engaging state of a hydraulically operated friction-engaging device incorporated in the subsidiary transmission 24.

The shifting between the gear positions "2nd" and "1st" is performed depending on a running state such as a vehicle speed and a demand drive force correlated value (target drive force correlated value), etc. More particularly, for instance, gear-position regions preliminarily determined on experimental tests are preliminarily stored as maps (shifting diagrams) to execute the control such that either one of these gear positions is determined depending on a detected drive state. The electronic control device 60 is provided with a shift-control electronic control device (T-ECU) for performing such control.

Further, the term "drive force correlated value" of the demand drive force correlated value corresponds to the drive force of the vehicle on one-on-one basis and may include not only drive torque or a drive force for the drive wheels, but also for instance output torque (transmitting-shaft torque) of the transmitting shaft 14, engine torque and vehicle acceleration. Furthermore, the term "demand drive force correlated value" refers to a demand value (target value) of the drive force correlated value determined based on for instance the accelerator-opening (or a throttle valve opening, an intake air quantity, an air/fuel ratio and a fuel injection rate), but the accelerator-opening may be used intact.

The central differential device 22 is comprised of a planetary gear set through which the drive force (torque) of the transmitting shaft 14 is suitably distributed to the front-wheel output shaft 18 and the rear-wheel output shaft 20. More particularly, the central differential device 22 is structured of a single pinion type planetary gear set, including three rotary elements and performing a known differential action. Three rotary elements are a sun gear S1, a ring gear R1 placed in a concentric relation to the sun gear S0, and a carrier CA1 supporting pinion gears P0 in meshing engagement with the sun gear S0 and the ring gear R1 such that the pinion gears P1 are rotatable about their axes and about the axis of the sun gear S1. The transmitting shaft 14 is connected to the carrier CA1 of the planetary gear set; the front-wheel output shaft 18 is connected to the ring gear R1; and the rear-wheel output shaft 20 is connected to the sun gear S1. Thus, a drive force distribution ratio α between the front-wheel output shaft 18 and the rear-wheel output shaft 20 can be determined depending on a difference between radii of the ring gear R1 and the sun gear S1.

Furthermore, the power transmitting device 10 is provided with the clutch C1 (corresponding to an engaging device of the present invention) in the form of an engaging device that is disposed between the front-wheel output shaft 18 and the rear-wheel output shaft 20. Causing the clutch C1 to engage or half-engage alters the drive force distribution ratio α between the front-wheel output shaft 18 and the rear-wheel output shaft 20.

The clutch C1 is a so-called friction-engaging device that generates brake torque due to the presence of friction. The friction-engaging device is a hydraulically operated friction-engaging device of a wet multi-disc type having multiple frictional plates stacked to be pressed against each other. Also, it is a band brake, etc. composed of a rotating drum and one or two bands, wound on an outer circumferential wall of the rotating drum and having one end or two ends operable to be tightened up with a hydraulic actuator, to selectively connect between adjacent component parts, i.e., between the front-wheel output shaft 18 and the rear-wheel output shaft 20 to each other.

The clutch C1 is arranged such that, when the electronic control device 60 switches an operating state of the hydraulic control circuit 66, a hydraulic pressure (engaging pressure) of working oil supplied to the hydraulic actuator of the clutch C is regulated to have engagement torque (engaging capacity) continuously variable depending on the resulting hydraulic pressure of working oil. With complete engagement of the clutch C1, the central differential device 22 is placed in a non-differential state under which the drive force is evenly distributed to the front wheels 34 and the rear wheels 40. In addition, a half-engagement (slip engaging state) of the clutch C1 allows the drive force distribution ratio between the front-wheel output shaft 18 and the rear-wheel output shaft 20 to be altered depending on resulting engagement torque.

Figure 3:
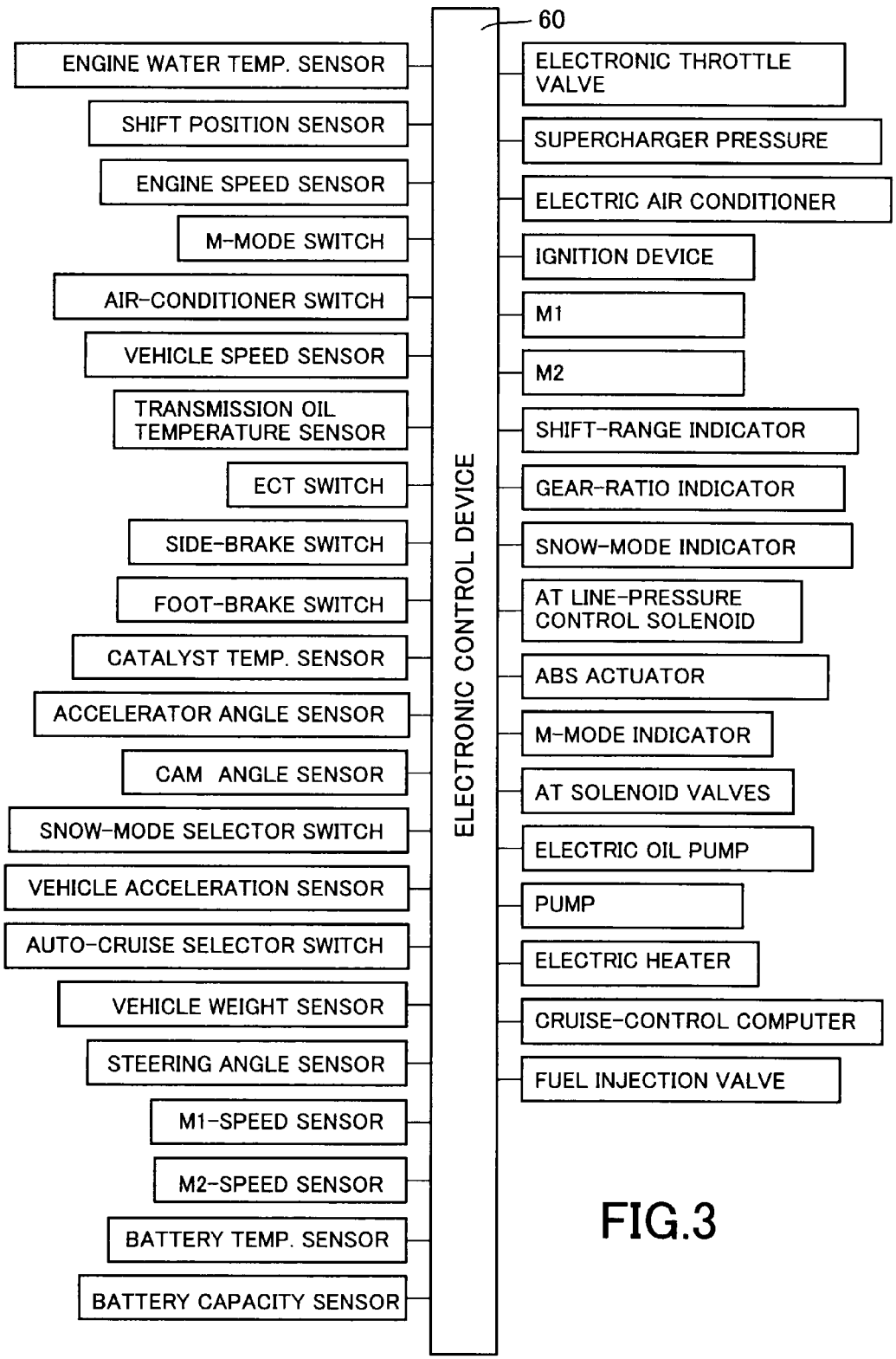
FIG. 3 is a view illustrating input and output signals applied to and delivered from an electronic control device incorporated in the power transmitting device shown in FIG. 1.

FIG. 3 exemplifies signals input to or output from the electronic control device 60 for controlling the power transmitting device 10 of the present embodiment. The electronic control device 60 has a structure including a so-called microcomputer composed of for example a CPU, a ROM, a RAM and input/output interfaces, etc. The CPU initiates signal processing in accordance with programs preliminarily stored in the ROM with utilizing a temporary storage function of the RAM, upon which operations are executed to perform drive controls such as hybrid drive controls of the engine 12 and the first and second electric motors MG1 and MG2, and shift control of the subsidiary transmission 24, etc.

The electronic control device 60 is arranged to receive from various sensors and switches shown in FIG. 3, various signals such as a signal indicative of a temperature $\text{TEMP}_W$ of cooling water of the engine 12; a signal indicative of a selected one of operating positions (shift positions) $P_{SH}$ of a manually operable shift lever; a signal indicative of the number of operations of the shift lever from a manual forward-drive shifting position M; a signal indicative of the engine rotation speed $N_E$ of the engine 12; a signal indicative of a value indicating a selected group of forward-drive positions of the power transmitting device 10; a signal indicative of an M mode (manual shifting mode); a signal indicative of an operated state of an air conditioner; a signal indicative of a vehicle speed V corresponding to the rear-wheel output shaft 20; a signal indicative of a temperature $T_{OIL}$ of a working fluid or oil of the subsidiary transmission 24; a signal indicative of an operated state of a side brake; a signal indicative of an operated state of a foot brake pedal; a signal indicative of a temperature of a catalyst; a signal indicative of a required amount of an output of the vehicle in the form of an amount of operation (an angle of operation) $A_{CC}$ of an accelerator pedal 42; a signal indicative of an angle of a cam; a signal indicative of the selection of a snow drive mode; a signal indicative of a longitudinal acceleration value G of the vehicle; a signal indicative of the selection of an auto-cruising drive mode; a signal indicative of a weight of the vehicle; signals indicative of a steering angle θ; a signal indicative of a rotating speed $N_{M1}$ of the first electric motor MG1; a signal indicative of a rotating speed $N_{M2}$ of the second electric motor MG2; and a signal indicative of an amount of electric energy SOC and a temperature $T_{BAT}$ stored in an electric-energy storage device 54.

The electronic control device 60 is further arranged to generate various signals such as control signals to be applied to an engine output control device to control the output of the engine 12, such as a drive signal to drive a throttle actuator for controlling an angle of opening $\theta_{TH}$ of an electronic throttle valve disposed in an intake pipe of the engine 12, a signal to control an amount of injection of a fuel by a fuel injecting device into the intake pipe or cylinders of the engine 12, a signal to be applied to an ignition device to control the ignition timing of the engine 12, and a signal to adjust a supercharger pressure of the engine 12; a signal to operate the electric air conditioner; signals to operate the first and second electric motors MG1 and MG2; a signal to operate a shift-range indicator for indicating the selected operating or shift position of the shift lever; a signal to operate a gear-ratio indicator for indicating the gear ratio; a signal to operate a snow-mode indicator for indicating the selection of the snow drive mode; a signal to operate an anti-lock brake actuator (ABS actuator); a signal to operate an M-mode indicator for indicating the selection of the M-mode; signals to operate solenoid-operated valves in the form of linear solenoid valves incorporated in a hydraulic control unit 66 provided to control the hydraulic actuators of the hydraulically operated frictional coupling devices of the clutch C and subsidiary transmission 24; a signal to operate a regulator valve incorporated in the hydraulic control unit 66, to regulate a line pressure $P_L$; a signal to control an electrically operated oil pump which is hydraulic pressure source for generating a hydraulic pressure that is regulated to the line pressure $P_L$; and a signal to drive an electric heater; a signal to be applied to a cruise-control computer.

Figure 4:
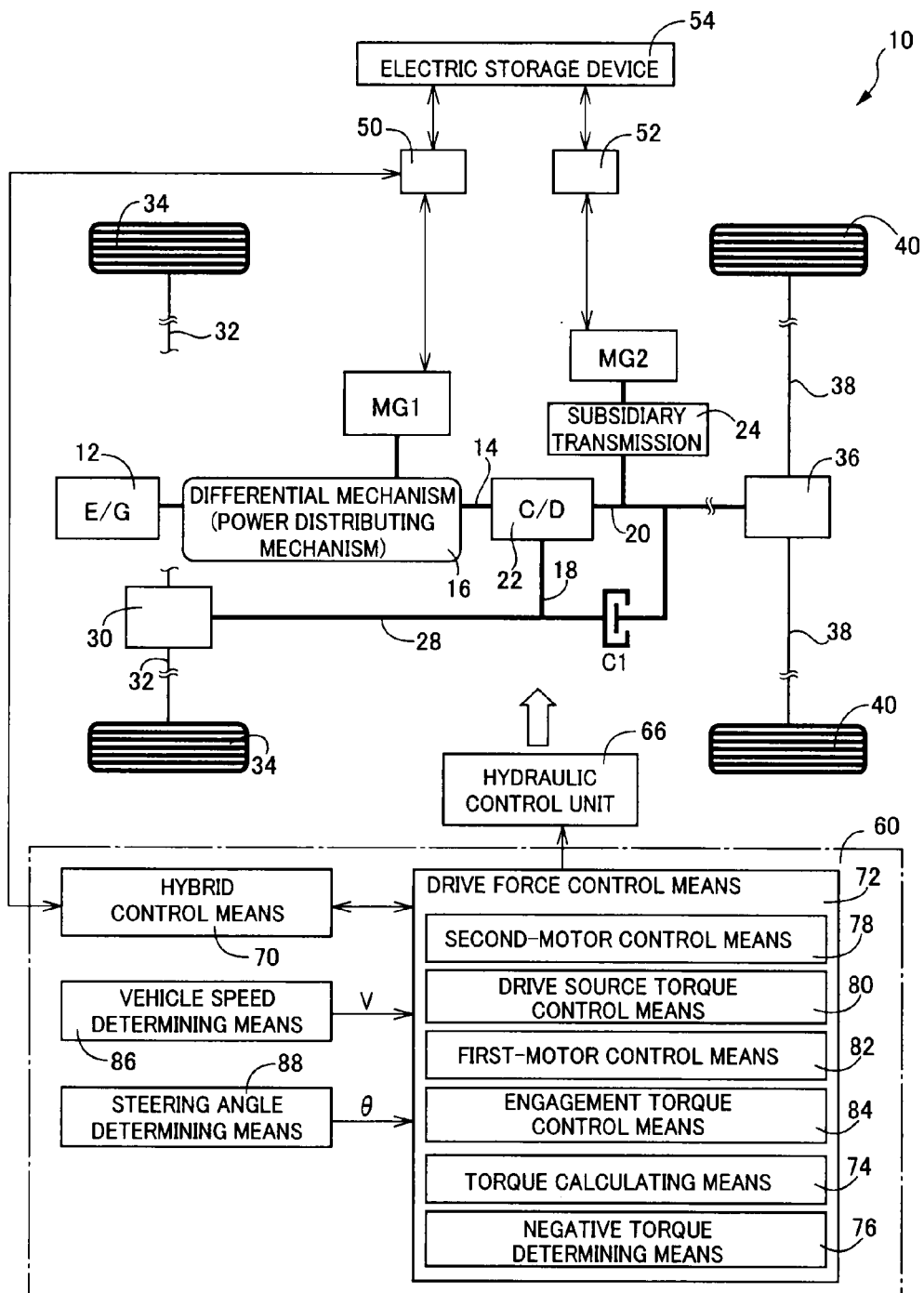
FIG. 4 is a functional block diagram illustrating a major part of a control function of an electronic control device that also functions as a control device of the power transmitting device.

FIG. 4 is a functional block diagram illustrating a major part of a control function executed by the electronic control device 60 (which is surrounded by a single dot line) that also functions as a control device for the power transmitting device 10. Hybrid control means 70 allows the engine 12 to operate within an operating range with increased efficiency, and causes a reactive force of the first electric motor MG1 arising from power generation thereof, to vary at an optimum rate for thereby controlling a speed ratio of the power distributing mechanism 16 in the form of the electrically controlled continuously variable transmission. For instance, with a running vehicle speed V at a given time, a target (demand) output of a vehicle is calculated based on an accelerator-opening Acc representing an output demand requested by a driver, and the vehicle speed V, upon which a total target output is calculated by referring to the resulting target output and a demand charge value of the vehicle. Then, a target engine output (demand engine output) $P_{ER}$ is calculated in consideration of a transmitting loss, auxiliary unit loads and a drive force of the second electric motor MG2 so as to obtain such a total target output. Subsequently, the engine 12 is controlled and the power generation amount of the first electric motor MG1 is controlled so as to achieve the engine rotation speed $N_E$ and engine torque $T_E$ for obtaining the target engine output $P_{ER}$.

The hybrid control means 70 allows electric energy generated by the first electric motor MG1 to be supplied via the inverter 50 to the battery 54 and the second electric motor MG2, and hence, a major part of the drive force of the engine 12 is mechanically transmitted to the central differential device 22. Further, a part of the drive force of the engine 12 is consumed with the first electric motor MG1 for generating electric power in conversion to electric energy, which in turn is supplied through the inverter 50 to the second electric motor MG2 to the same. Thus, the drive force is transmitted from the second electric motor MG2 through the subsidiary transmission 24 to the rear-wheel output shaft 20. Thus, a series of equipments, involved in generating electric power and operating the second electric motor MG2 with consumption of electric energy, establish an electrical path which converts a part of the drive force of the engine 12 to electrical energy and converts the resulting electrical energy to mechanical energy. Here, the hybrid control means 70 outputs a command to the hydraulic control circuit 66 for the subsidiary transmission 24 to be suitably switched to a gear position in need of shifting.

Further, the hybrid control means 70 functionally includes engine output control means for executing output control of the engine 12 such that a demand engine output is generated. That is, the hybrid control means 70 outputs commands solely or in combination for causing a throttle actuator to controllably open or close an electronic throttle valve for throttle control, and additionally compels a fuel injection device to control a fuel injection quantity and a fuel injection timing for fuel injection control, and compels an ignition device such as an igniter or the like to control an ignition timing for ignition timing control.

Furthermore, the hybrid control means 70 is also operable to allow the second electric motor MG2 to initiate a motor running mode with the engine 12 caused to halt in operation. In usual practice, during the motor running mode, the engine 12 is halted in operation, and hence, the drive force of the engine 12 is zeroed. Thus, the hybrid control means 70 allows the subsidiary transmission 24 to be switched to for instance the low speed gear position "1st" under which the second electric motor MG2 is driven to run the vehicle.

During coast running (coast running mode) with the accelerator pedal being released and during braking with a foot brake, etc., moreover, the hybrid control means 70 functions as regenerative control means. That is, for improving fuel consumption, kinetic energy of the vehicle, i.e., a reverse drive force transmitted from the rear wheels 40 to the engine 12 rotatably drives the second electric motor MG2 to operate it as the electric power generator. Resulting electric energy, i.e., a second motor generation current is charged to the battery 54 via the inverter 52. Such regenerative control is performed so as to achieve a regeneration amount that is determined based on the state of charge SOC of the battery 54, and a brake force distribution etc. of a brake force resulting from a hydraulic-pressure brake actuated for obtaining the brake force depending on a brake pedal displacement value.

If the state of charge SOC of the battery 64 falls below a predetermined lower limit value, the hybrid control means 70 renders not only the first electric motor MG1 but also the second electric motor MG2 operative as the electric power generators during the power running mode of the engine 12 for increasing the power generation amount. Thus, control is performed such that the state of charge SOC of the battery 54 immediately reaches an appropriate residual charge. When this takes place, a target power generation amount of the second electric motor MG2 is determined depending on the state of charge SOC of the battery 54, upon which power generation torque Tm (regenerative torque) of the second electric motor MG2 is controlled depending on the resulting power generation amount.

Figure 5:
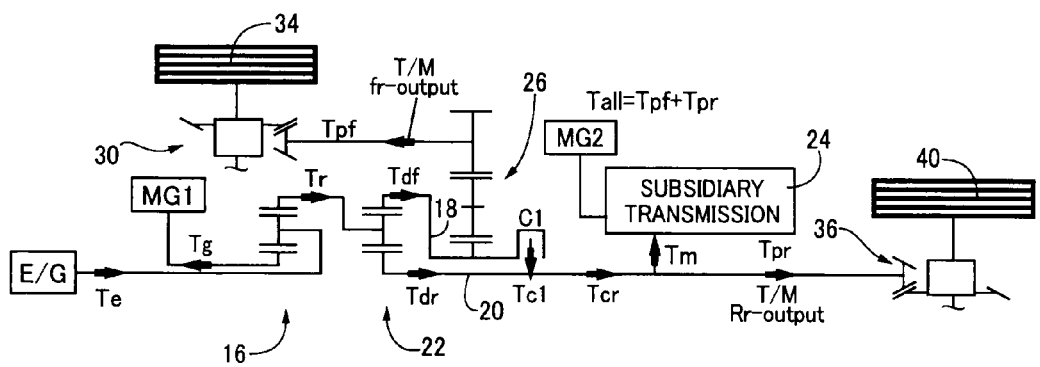
FIG. 5 is a view illustrating a torque distribution accomplished on executing regenerative control by first and second electric motors during an engine running mode.

FIG. 5 is a view illustrating torque distribution to be achieved when the first and second electric motors MG1 and MG2 execute power generation controls (regenerative controls). Engine torque Te output from the engine 12 is distributed to power generation torque Tg of the first electric motor MG1, and ring gear output torque Tr to be output to the ring gear R0 of the power distributing mechanism 16, depending on a predetermined drive force distribution ratio ρ of the power distributing mechanism 16. Power generation torque Tg and ring gear output torque Tr are expressed by equations (1) and (2) described below. Also, ring gear output torque Tr corresponds to torque of the transmitting shaft 14.

$$Tg = Te \times \rho \tag{1}$$

$$Tr = Te \times (1-\rho) \tag{2}$$

Ring gear output torque $T_R$ is distributed to front-wheel output-shaft output torque Tdf for the front-wheel output shaft 18, and rear-wheel output-shaft output torque Tdr for the rear-wheel output shaft 20 at rates depending on the drive force distribution ratio α of the central differential device 22. Front-wheel output-shaft output torque Tdf and rear-wheel output-shaft output torque Tdr are given by equations (3) and (4) described below.

$$Tdf = Tr \times \alpha \tag{3}$$

$$Tdr = Tr \times (1-\alpha) \tag{4}$$

With the clutch C1 remained disengaged, front-wheel output torque Tpf, transmitted to the front wheels 34, and clutch downstream-side output torque Tcr, transmitted to the clutch C1 at a downstream (facing the rear wheels) thereof, are expressed by equations (5) and (6) described below. Also, no gear ratio of the gear pair 26 is taken into consideration.

$$Tpf = Tdf \tag{5}$$

$$Tcr = Tdr \tag{6}$$

With the clutch C1 remained engaged (half-engaged), front-wheel output torque Tpf transmitted to the front wheels 34, and clutch downstream-side output torque Tcr transmitted to the clutch C1 at the downstream (facing the rear wheels) thereof, are expressed by equations (7) and (8) described below, respectively. Here, Tc1 represents clutch-engagement torque of the clutch C1 that is altered in a non-stepwise manner depending on an engaging pressure supplied to the hydraulic actuator of the clutch C1.

$$Tpf = Tdf31 \ Tc1 \tag{7}$$

$$Tcr = Tdr + Tc1 \tag{8}$$

Rear-wheel output torque Tpr output from the rear wheels 40 is determined in terms of clutch downstream-side output torque Tcr and power generation torque Tm of the second electric motor MG2, and is expressed by equation (9) described below. In addition, a total drive force Tall of the vehicle is equal to a sum of front-wheel output torque Tpf and rear-wheel output torque Tpr as expressed by equation (10) described below.

$$Tpr = Tcr - Tm \tag{9}$$

$$Tall = Tpf + Tpr \tag{8}$$

Figure 12:
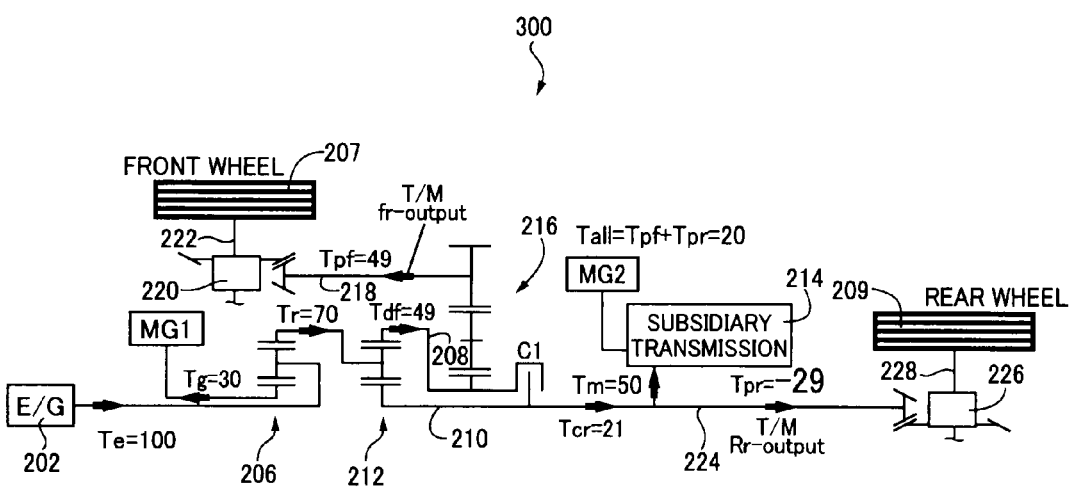
FIG. 12 is an another skeleton view illustrating a structure of power transmitting device for a four-wheel drive hybrid-vehicle.

With the power transmitting device 10 of the present embodiment, the target power generation amount, i.e., power generation torque Tm of the second electric motor MG2, is determined based on the state of charge SOC of the battery 54. As the target power generation amount (power generation torque Tm) increases, it is likely that rear-wheel output torque Tpr falls in negative torque. In FIG. 12 for instance suppose that engine torque Te is 100, and power generation torque Tm of the second electric motor MG2 is 50. Rear-wheel output torque Tpr output from the rear wheels 40 has a value of −29 in negative torque. If rear-wheel output torque Tpr falls in such negative torque, no drive force is distributed properly to the front wheels 34 and the rear wheels 40, adversely affecting to the running performance.

In contrast, drive force control means 72 shown in FIG. 4 executes control such that rear-wheel output torque Tpr transmitted to the rear wheels 40 falls in positive torque, during power generation controls executed by the first and second electric motors MG1 and MG2. Hereunder, control operations of the drive force control means 72 is described.

The drive force control means 72 has a structure including torque calculating means 74, negative torque determining means 76, second-motor control means 78, drive source torque control means 80, first-motor control means 82 and engagement torque control means 84. On executing such control mentioned above, first, the torque calculating means 74 calculates a clutch downstream-side output torque Tcr based on calculating equations (1) to (10) described above, and calculates a power generation torque Tm of the second electric motor MG2 based on the state of charge SOC of the battery 54. Here, the power generation torque Tm is determined based on a torque map plotted in terms of, for instance, the state of charge SOC of the battery 54 and the power generation torque Tm and relational expression that are preliminarily determined.

The negative torque determining means 76 determines a magnitude relation between the clutch downstream-side output torque Tcr calculated by the torque calculating means 74, and the power generation torque Tm of the second electric motor MG2. For instance, if the clutch downstream-side output torque Tcr is greater than the power generation torque Tm, then, the rear-wheel output torque Tpr transmitted to the rear wheels 40 has positive torque as will be given by equation (9). On the contrary, if clutch downstream-side output torque Tcr is less than power generation torque Tm, then, rear-wheel output torque Tpr transmitted to the rear wheels 40 has the negative torque as will be given by equation (9).

Thus, if a determination is made that rear-wheel output torque Tpr falls in negative torque, then, the drive force control means 72 outputs a command to the second-motor control means 78 for limiting power generation torque Tm of the second electric motor MG2, i.e., for limiting the power generation amount of the second electric motor MG2. For the calculated clutch downstream-side output torque Tcr, accordingly, the second-motor control means 78 limits (lowers) the power generation torque Tm of the second electric motor MG2 such that power generation torque Tm is equal to or less than the clutch downstream-side output torque Tcr. Thus, rear-wheel output torque Tpr is controlled not to fall in negative torque but to fall in positive torque.

Here, if the second-motor control means 78 limits the power generation torque Tm, a fluctuation occurs in total drive force Tall of the vehicle as will be apparent from equations (9) and (10). This causes the driver suffering from discomfort feeling due to a drive force fluctuation caused during the vehicle running. However, the drive force control means 72 outputs commands to the drive source torque control means 80 and the first-motor control means 82 for controlling the engine 12 and the first electric motor MG1, respectively, such that no fluctuation takes place in the total drive force Tall of the vehicle. Upon receipt of such commands, the drive source torque control means 80 and the first-motor control means 82 limit engine torque Te and power generation torque Tg of the first electric motor MG1, thereby minimizing a fluctuation in the total drive force.

Figure 6:
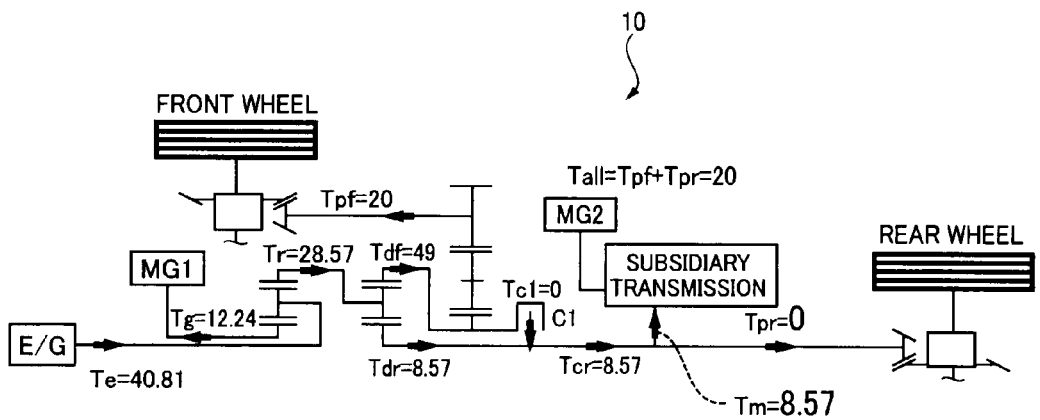
FIG. 6 is a view illustrating a torque distribution of the power transmitting device in execution of drive force control means.

FIG. 6 represents a torque distribution achieved when the drive force control means 72 is executed. In FIG. 6, calculations are made with the power distributing mechanism 16 having a torque distribution between the first electric motor MG1 and the transmitting shaft 14 being set to 3:7 (with a distribution ratio ρ=0.3), and a torque distribution of the central differential device 22 between the front-wheel output shaft 18 and the rear-wheel output shaft 20 being set to 7:3 (with a distribution ratio ρ=0.7). In addition, the total drive force Tall of the vehicle is calculated to lie at the same value of 20 as that appearing before the beginning of the control. Moreover, the total drive force Tall of the vehicle corresponds to a demand drive force by the driver that is determined depending on the accelerator-opening Acc representing the displacement value of the accelerator pedal 46, and the vehicle speed V, etc. Thus, the control is performed so as to ensure the total drive force Tall. With the present embodiment, besides, the clutch C1 is left under a disengaging state.

Prior to the execution of the drive force control means 72, if the drive force control means 72 is executed when engine torque Te is 100 (with the total drive force Tall being 20) and power generation torque Tm based on the power generation amount of the second electric motor MG2 is 50, various torque distributions are altered as shown in FIG. 6. As shown in FIG. 6, power generation torque Tm of the second electric motor MG2 has a target value of 50 but limited to a value of 8.57 with a consequence of a limitation in the power generation amount of the second electric motor MG2.

Here, limiting power generation torque Tm increased the total drive force Tall. However, the drive source torque control means 80 and the first-motor control means 82 cause engine torque Te to decrease from 100 to 40.81, and cause power generation torque Tg to be limited from 30 to 12.24. Thus, the total drive force Tall is sustained to be 20. This prevents rear-wheel output torque Tpr of the rear wheels 40 from falling into negative torque with a status under which the total drive force Tall is sustained. In addition, the limited amount in engine torque Te of the engine 12 and power generation torque Tg of the first electric motor MG1 can be calculated based on equations (1) to (10) described above.

Figure 7:
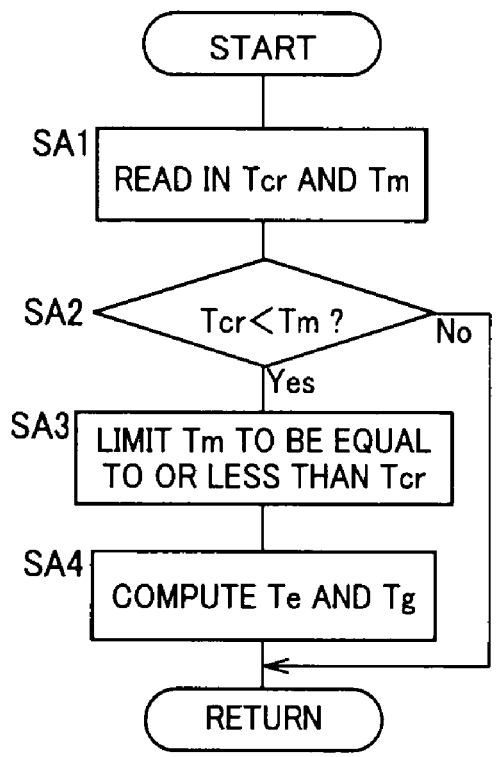
FIG. 7 is a flow chart for illustrating a major part of control operations to be executed with the electronic control device, i.e., control operation for preventing rear wheels from having negative torque on executing power generation control by the first and second electric motors.

FIG. 7 is a flow chart for illustrating a major part of control operations to be executed by the electronic control device 60, i.e., control operation for preventing rear-wheel output torque Tpr of the rear wheels 40 from falling in negative torque on executing power generation controls by the first and second electric motors MG1 and MG2. Such control operations will be repeatedly executed for an extremely short cycle in the order of for instance several milliseconds or several tens milliseconds.

First, at SA1 (hereinafter the term "step" will be omitted) corresponding to the torque calculating means 74, clutch downstream-side output torque Tcr and power generation torque Tm of the second electric motor MG2 are calculated and read in. At succeeding SA2 corresponding to the negative torque determining means 76, a query is made as to whether clutch downstream-side output torque Tcr is less than power generation torque Tm of the second electric motor MG2. If the answer to SA2 is no, then, a determination is made that rear-wheel output torque Tpr of the rear wheels 40 does not fall in negative torque and the current routine is terminated.

On the contrary, if the answer to SA2 is yes, then, a determination is made that rear-wheel output torque Tpr of the rear wheels 40 falls in negative torque, upon which at SA3 corresponding to the second-motor control means 78, control for limiting power generation torque Tm of the second electric motor MG2 is executed. In accordance with such limiting control, for suppressing a total drive-force fluctuation at SA3, at SA4 corresponding to the drive source torque control means 80 and the first-motor control means 82, engine torque Te of the engine 12 and power generation torque Tg of the first electric motor MG1, causing no fluctuation to take place in the total drive force Tall, are calculated and control for the calculated engine torque Te and power generation torque Tg is performed.

As mentioned above, with the present embodiment, a drive force control means 72 executes a control such that under a circumstance where the first and second electric motors MG1 and MG2 execute electric-power generation controls, an output torque of rear drive wheels 40 falls in positive torque. This prevents torque of the front wheels 34 and torque of the rear wheels 40 from orienting in different directions. Accordingly, the front wheels 34 and the rear wheels 40 have torques oriented in the same direction, favorably preventing the occurrence of discomfort during the vehicle running.

With the present embodiment, the drive force control means 72 limits a power generation amount of the second electric motor MG2. This favorably prevents rear-wheel output torque Tpr of the rear wheels 40 from falling in negative torque.

With the present embodiment, the drive force control means 72 limits the drive force of the engine 12 and a power generation amount of the first electric motor MG1 so as to suppress a fluctuation in a total drive force of the vehicle. This suppresses the occurrence of the drive-force fluctuation during the execution of control, thereby preventing the occurrence of discomfort caused by the drive force fluctuation during the vehicle running.

Next, another embodiment according to the present invention will be described below. Also, various component members or portions common to those of the previous embodiment bear like reference numerals to omit redundant description.

[Embodiment 2]

When the first and second electric motors MG1 and MG2 execute power generation controls, the drive force control means 72 limits the power generation amount of the second electric motor MG2, and it additionally controls the engagement torque of the clutch C1 disposed between the front-wheel output shaft 18 and the rear-wheel output shaft 20. This prevents the rear-wheel output torque Tpr of the rear wheels 40 from falling in negative torque. The drive force control means 72 outputs a command to engagement torque control means 84 for causing the clutch C1 to be engaged (half-engaged). With engagement (half-engagement) of the engagement torque control means 84 by the clutch C1, a part of the front-wheel output-shaft output torque Tdf is transmitted to the clutch downstream-side output torque Tcr in accordance with equations (7) and (8), increasing the clutch downstream-side output torque Tcr. Accordingly, the engagement torque control means 84 appropriately alters clutch engagement torque of the clutch C1 depending on for instance determined power generation torque Tm such that rear-wheel output torque Tpr of the rear wheels 40 is prevented from falling in negative torque. This prevents rear-wheel output torque Tpr from falling in negative torque, and can ensure power generation torque Tm to be adequate for the second electric motor MG2 to generate electric power.

Here, if the engagement of the clutch C1 is executed under a given running condition such as for instance a turning running, the differential action of the central differential device 22 is limited with resultantly causing a tight-corner braking phenomenon. During the execution of such control mentioned above, the drive force control means 72 inhibits the engagement control of the clutch C1 in a region where the tight-corner braking phenomenon, determined based on the steering angle θ and the vehicle speed V etc. during the turning running is likely to occur. For instance, negative-torque preventive control on rear-wheel output torque Tpr is executed by limiting the power generation amount of the second electric motor MG2.

In FIG. 4, vehicle speed determining means 86 determines if a detected vehicle speed V falls in the range between the predetermined lower limit vehicle speed V1 and the predetermined upper limit vehicle speed V2 where the tight-corner braking phenomenon is likely to occur. Further, steering angle determining means 88 determines if the steering angle θ detected by for instance a steering angle meter (not shown), exceeds a predetermined lower limit steering angle θ1 in which the tight-corner braking phenomenon is likely to occur. Moreover, the "lower limit vehicle speed V1", the "upper limit vehicle speed V2" and the "steering angle θ" are obtained preliminary through experimental tests and analyses and suitably altered depending on a type, etc., of a vehicle to be applied.

Figure 8:
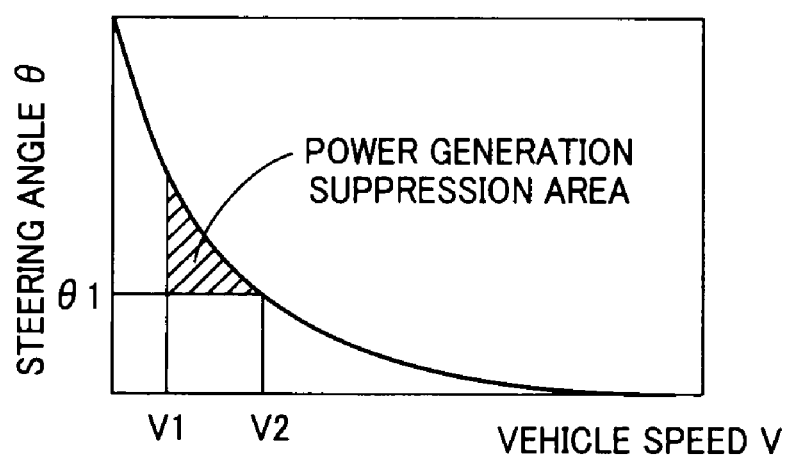
FIG. 8 is a view representing a region, plotted in terms of a vehicle speed and a steering angle, in which a tight-corner braking phenomenon is likely to occur during engagement of a clutch.

FIG. 8 is a view showing a region, plotted in terms of the vehicle speed V and the steering angle θ, in which the tight-corner braking phenomenon is likely to occur with the clutch C1 remained engaged. As shown in FIG. 8, the tight-corner braking phenomenon is likely to occur in a range where the vehicle speed V falls in a range between the lower limit vehicle speed V1 and the upper limit vehicle speed V2 indicated by a hatched area, and the steering angle θ exceeds the lower limit steering angle θ1. In such a range, the engagement of the clutch C1 is inhibited and for instance suppression control for the power generation amount of the second electric motor MG2 is executed as alternative means of the engagement of the clutch C1.

Figure 9:
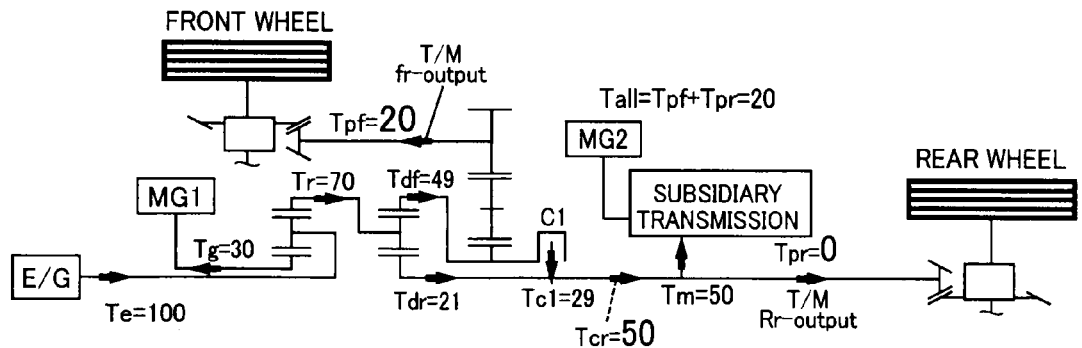
FIG. 9 is another view illustrating a torque distribution of the power transmitting device in execution of the drive force control means.

FIG. 9 shows a torque distribution achieved on executing the drive force control means 72. In FIG. 9, calculations are made with the torque distribution of the power distributing mechanism 16 between the first electric motor MG1 and the transmitting shaft 14 being set to 3:7 (with a distribution ratio ρ=0.3), and a torque distribution of the central differential device 22 between the front-wheel output shaft 18 and the rear-wheel output shaft 20 being set to 7:3 (with a distribution ratio ρ=0.7). In addition, the total drive force Tall of the vehicle is calculated to have a value of 20.

Prior to executing the drive force control means 72, during a vehicle running when engine torque Te is 100 (with the total drive force Tall being 20), power generation torque Tm based on the power generation amount of the second electric motor MG2 is 50. If the drive force control means 72 is executed, various torque distributions are altered as shown in FIG. 9. As shown in FIG. 9, controlling the engagement torque of the clutch C1 causes clutch engagement torque Tc1 (=29) to be transmitted to the rear-wheel output shaft 20 such that the clutch downstream-side output torque Tcr becomes 50. Accordingly, the clutch downstream-side output torque Tcr and the power generation torque Tm are equal to each other, thereby ensuring power generation amount demanded for the second electric motor MG2. Further, rear-wheel output torque Tpr of the rear wheels 40 zeroed prevents the occurrence of negative torque. Furthermore, the vehicle having a total drive force Tall (=Tpf+Tpr) of 20, similarly precludes the occurrence of a fluctuation in drive force of the vehicle.

Figure 10:
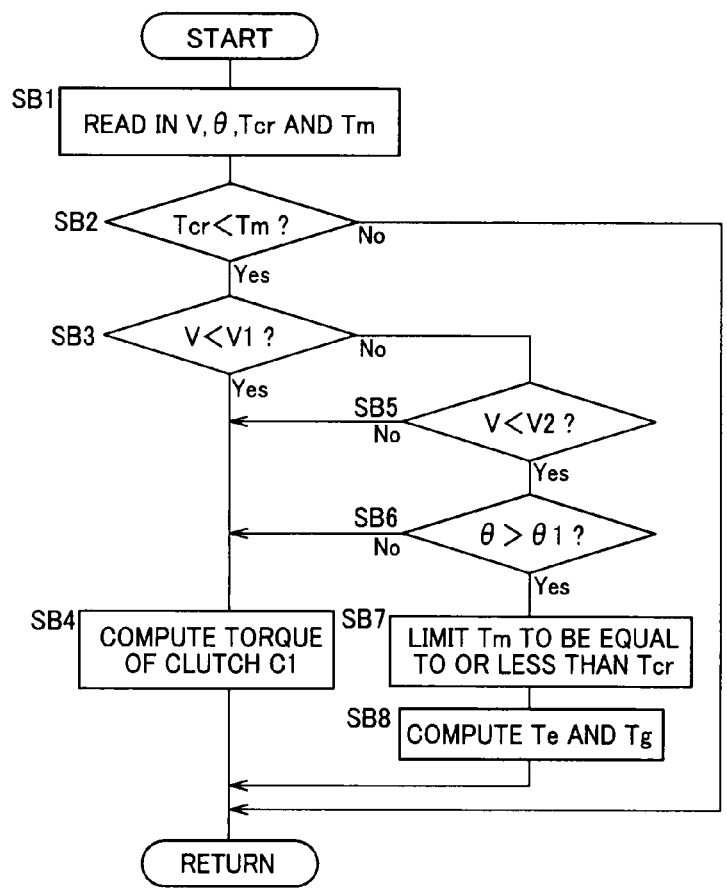
FIG. 10 is another flow chart for illustrating a major part of control operations to be executed with the electronic control device, i.e., control operations for preventing rear wheel output torque of the rear wheels from falling in a negative torque on executing the power generation control by the first and second electric motors.
Figure 11:
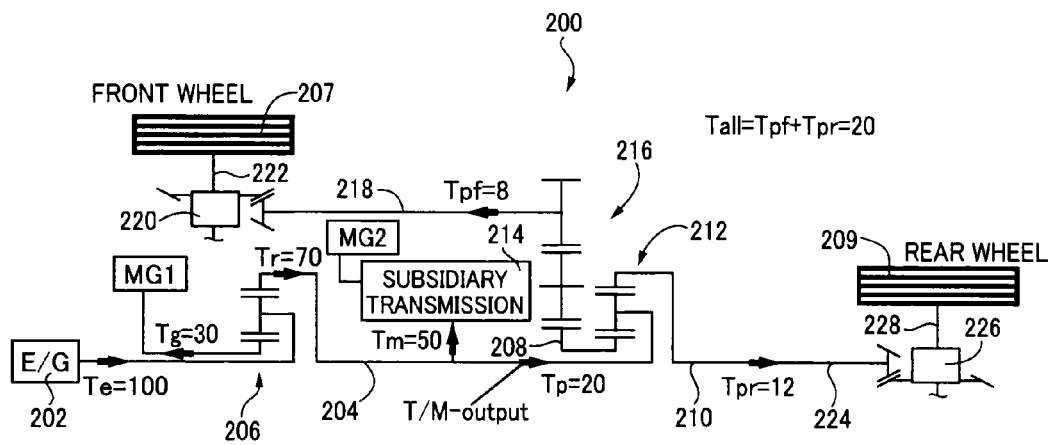
FIG. 11 is a skeleton view illustrating a structure of a conventional power transmitting device for four-wheel drive hybrid-vehicle.

FIG. 10 is another flow chart for illustrating a major part of control operation, executed with the electronic control device 60, i.e., control operation for preventing rear-wheel output torque Tpr of the rear wheels 40 from falling in negative torque when the first and second electric motor MG1 and MG2 execute power generation control. This sequence will be repeatedly executed for an extremely short cycle of several milliseconds or several tens milliseconds.

First, at step SB1 (hereinafter the term "step" will be omitted) corresponding to the torque calculating means 74, the clutch downstream-side output torque Tcr, the power generation torque Tm of the second electric motor MG2, the vehicle speed V and the steering angle θ are read in. At succeeding SB2 corresponding to the negative torque determining means 76, a query is made as to whether the clutch downstream-side output torque Tcr is less than the power generation torque Tm of the second electric motor MG2. If the answer to SB2 is no, then, a determination is made that no rear-wheel output torque Tpr of the rear wheels 40 falls in negative torque and the current routine is completed. In contrast, if the answer to SB2 is yes, then, at SB3 corresponding to the vehicle speed determining means 86, a query is made as to whether the vehicle speed V is less than the lower limit vehicle speed V1. If the answer to SB3 is no, then, at SB3 corresponding to the vehicle speed determining means 86, a query is made as to whether the vehicle speed V is less than the upper limit vehicle speed V2.

If the answer to SB5 is yes, then, a determination is made that the vehicle speed V falls in an area between the lower limit vehicle speed V1 and the upper limit vehicle speed V2. Further, at SB6 corresponding to steering angle determining means 88, a query is made as to whether the steering angle θ falls below the lower limit steering angle θ1. If the answer to SB6 is yes, then, a determination is made that the vehicle enters a running state in the region indicated by the hatched area in FIG. 8 where the tight-corner brake phenomenon is likely to occur. In this case, at SB7 corresponding to the second-motor control means 78, the second electric motor MG2 is controlled such that its power generation torque Tm is equal to or less than clutch downstream-side output torque Tcr. Then, at SB8 corresponding to the drive source control means 80 and the first-motor control means 82, the engine torque Te and the power generation torque Tg of the first electric motor MG1 are controlled, thereby suppressing the fluctuation in total drive force of the vehicle.

In contrast, if the answer to SB3 is yes, the answer to SB5 is no or the answer to SB6 is no, i.e., a running state with a low fear of the tight-corner braking phenomenon is determined, then, at SB4 corresponding to the engagement torque control means 84, engagement control of the clutch C1 is executed. More particularly, engagement torque of the clutch C1, i.e., the engagement pressure of the hydraulic actuator of the clutch C1 is controlled, for the power generation torque Tm of the second electric motor MG2 determined based on the state of charge SOC of the battery 54, such that clutch downstream-side output torque Tcr does not fall below determined power generation torque Tm.

With the present embodiment, as set forth above, the drive force control means 72 performs control such that the rear-wheel output torque Tpr of the rear wheels 40 falls in positive torque under a circumstance where the first and second electric motors MG1 and MG2 execute power generation control. This prevents torques of the front wheels 34 and the rear wheels 40 from orienting in different directions. Accordingly, torques of the front wheels 34 and the rear wheels 40 are oriented in the same direction, thereby favorably preventing the occurrence of discomfort feeling during the vehicle running.

With the present embodiment, the clutch C1 is disposed between the front-wheel output shaft 18 and the rear-wheel output shaft 20, and the drive force control means 72 allows the clutch C1 to be engaged or half-engaged. This can properly alter the drive force distribution between the front-wheel output shaft 18 and the rear-wheel output shaft 20. Accordingly, the torque distribution to the rear-wheel output shaft 20 can be increased, and torque distributed to the rear-wheel output shaft 20 can be increased depending on power generation torque Tm, thereby preventing the rear wheels 40 from falling in negative torque.

With the present embodiment, the drive force control means 72 inhibits an engaging control of the clutch C1 depending on both a steering angle θ and a vehicle speed V in a turning running. This can properly prevent the tight-corner braking phenomenon from occurring during for instance the turning running.

With the present embodiment, the drive force control means 72 limits a power generation amount by the second electric motor MG2 under a circumstance where the engaging control for the clutch C1 is inhibited. This can avoid the occurrence of the tight-corner braking phenomenon, and can properly prevent the rear wheels 40 from falling in negative torque.

While the embodiments of the present invention have been described above in detail with reference the drawings, the present invention may be implemented in other modes.

In the illustrated embodiments set forth above, for instance, the clutch C1 is of the type that allows engagement torque Tc1 to be altered on controlling the hydraulic pressure applied to the hydraulic actuator. However, the present invention is construed not to be limited to such a hydraulic pressure control and the clutch C1 may be the type in which engagement torque Tc1 is altered in another mode by using for instance an electromagnetic clutch or the like.

In the illustrated embodiments set forth above, further, the drive force control means 72 separately executes negative torque prevention of rear-wheel output torque Tpr for the rear wheels 40, with the limitation of the power generation amount of the second electric motor MG2 and negative torque prevention of rear-wheel output torque Tpr for the rear wheels 40 with the engagement control of the clutch C1. However, none of these measures necessarily has a need to be solely executed and the above controls may be executed in combination.

In the illustrated embodiments set forth above, furthermore, under a circumstance where the tight-corner braking phenomenon is likely to occur, the engagement control of the clutch C1 is inhibited. However, no need arises for the engagement control of the clutch C1 to be completely inhibited, and for instance, a control mode may be adopted in a way to allow engagement torque of the clutch C1 to be lower than that of the clutch C1 in a normal use.

In the illustrated embodiments set forth above, moreover, the determination is made whether to inhibit the engagement control of the clutch C1 depending on the steering angle θ and the vehicle speed V during the turning running. However, such a determination may be additionally depended on for instance other parameters such as a road surface gradient and a road surface friction coefficient, etc.

In the illustrated embodiments set forth above, besides, the subsidiary transmission 24 is of the transmission that enables the two speeds of the high speed gear position "2nd" and the low speed gear position "1st" to be switched. However, the present invention is construed not to be necessarily limited to such two speeds, the subsidiary transmission 24 may include an automatic transmission having gear positions with three speeds or more. In addition, the present invention is construed not to be limited to the step-variable transmission, and the subsidiary transmission 24 may include a continuously variable transmission. Moreover, no subsidiary transmission 24 is necessarily required, and the subsidiary transmission 24 may be omitted.

In the illustrated embodiments set forth above, further, although the central differential device 22 is structured of the planetary gear unit, the central differential device 22 may have the other structure such as for instance a bevel gear or the like.

In the illustrated embodiments set forth above, furthermore, executing the drive force control means 72 controls the rear-wheel output torque Tpr to be zeroed. However, rear-wheel output torque Tpr is not necessarily limited to zero and may be controlled to lie at positive torque beyond zero.

It is intended that the embodiments described be considered only as illustrative of the present invention and that the present invention may be implemented in various modifications and improvements in the light of knowledge of those skilled in the art.

What is claimed is:

1. A control device for a power transmitting device for a four-wheel drive hybrid-vehicle having a drive source, a power distributing mechanism for distributing a drive force of the drive source to a first electric motor and a transmitting shaft, a central differential device connected to the transmitting shaft to distribute the drive force from the transmitting shaft to a first drive-wheel-side output shaft and a second drive-wheel-side output shaft, and a second electric motor connected to the second drive-wheel-side output shaft to transmit a power thereto, the control device comprising:

a drive force control portion programmed to execute a control such that, under a circumstance where the first and second electric motors execute electric-power generation controls, an output torque of second drive wheels is a positive torque, whereby both the output torque of the second drive wheels and an output torque of first drive wheels are oriented in a same direction.

2. The control device for the power transmitting device for the four-wheel drive hybrid-vehicle according to claim 1, wherein the drive force control portion limits a power generation amount of the second electric motor.

3. The control device for the power transmitting device for the four-wheel drive hybrid-vehicle according to claim 2, wherein the drive force control portion limits the drive force of the drive source and a power generation amount of the first electric motor so as to suppress a fluctuation in a total drive force of the vehicle.

4. The control device for the power transmitting device for the four-wheel drive hybrid-vehicle according to claim 1, further comprising an engaging device disposed between the first drive-wheel-side output shaft and the second drive-wheel-side output shaft;

wherein the drive force control portion allows the engaging device to be engaged or half-engaged.

5. The control device for the power transmitting device for the four-wheel drive hybrid-vehicle according to claim 4, wherein the drive force control portion inhibits an engaging control of the engaging device depending on both a steering angle and a vehicle speed while the hybrid-vehicle is turning.

6. The control device for the power transmitting device for the four-wheel drive hybrid-vehicle according to claim 5, wherein the drive force control portion limits a power generation amount by the second electric motor under a circumstance where the engaging control for the engaging device is inhibited.

* * * * *